(12) United States Patent
Booth

(10) Patent No.: US 7,725,402 B2
(45) Date of Patent: May 25, 2010

(54) SYSTEM AND METHOD FOR BOOKING A PERFORMANCE VENUE

(76) Inventor: John R. Booth, 2010-301 Quaker Landing, Raleigh, NC (US) 27603

( * ) Notice: Subject to any disclaimer, the term of this patent is extended or adjusted under 35 U.S.C. 154(b) by 1849 days.

(21) Appl. No.: 10/109,675

(22) Filed: Apr. 1, 2002

(65) Prior Publication Data

US 2003/0187802 A1  Oct. 2, 2003

(51) Int. Cl.
*G06Q 40/00* (2006.01)
*G06Q 20/00* (2006.01)

(52) U.S. Cl. .......................................... 705/65; 705/35

(58) Field of Classification Search ................... 705/26, 705/20, 80, 37, 65, 35
See application file for complete search history.

(56) References Cited

U.S. PATENT DOCUMENTS

| | | | |
|---|---|---|---|
| 6,173,209 B1 * | 1/2001 | Laval et al. ................... 700/91 |
| 6,311,214 B1 * | 10/2001 | Rhoads ....................... 709/217 |
| 6,446,045 B1 * | 9/2002 | Stone et al. ................... 705/26 |
| 6,449,601 B1 * | 9/2002 | Friedland et al. .............. 705/37 |
| 6,473,084 B1 * | 10/2002 | Phillips et al. .............. 345/440 |
| 6,496,809 B1 * | 12/2002 | Nakfoor ...................... 705/80 |
| 6,704,716 B1 * | 3/2004 | Force ......................... 705/80 |
| 6,792,411 B1 * | 9/2004 | Massey, Jr. .................. 705/35 |
| 2002/0004751 A1 * | 1/2002 | Seki et al. .................... 705/20 |
| 2002/0062258 A1 * | 5/2002 | Bailey et al. ................. 705/26 |
| 2002/0065689 A1 * | 5/2002 | Bingham et al. ............... 705/5 |
| 2002/0077953 A1 * | 6/2002 | Dutta ......................... 705/37 |
| 2002/0116343 A1 * | 8/2002 | Nakamura et al. ............ 705/65 |
| 2002/0120600 A1 * | 8/2002 | Schiavone et al. ............. 707/1 |
| 2002/0123958 A1 * | 9/2002 | Hara et al. .................... 705/37 |
| 2002/0128922 A1 * | 9/2002 | Joao ........................... 705/26 |
| 2003/0097307 A1 * | 5/2003 | Greene ........................ 705/26 |
| 2003/0236722 A1 * | 12/2003 | Kamel ........................ 705/34 |
| 2005/0154620 A1 * | 7/2005 | Hentschel et al. .............. 705/5 |

OTHER PUBLICATIONS

Clear Channel Entertainment: Live Entertainment p. 1-2 <http://cc.com/>.
Etix.com p. 1-2 <http:www1.etix.com/ticket/online/index.html>.
Event Planning and Organization Simplified p. 1 <http://www.evite.com/homepage?redirect=http%3A%2F%2Fwww.evite.com%2F>.
Fandango—How It Works p. 1-2 <http://www.fandango.com/cs_howitworks.asp>.
Launch—Your Yahoo! Music Experience—Music videos, internet radio, artist photos p. 1-2 <http://launch.yahoo.com/default.asp>.
Online Registration—RegOnline p. 1-3 <https://www.regonline.com/testimonials.asp>.

(Continued)

*Primary Examiner*—Evens J Augustin
(74) *Attorney, Agent, or Firm*—Hunton & Williams LLP

(57) ABSTRACT

A system and method for booking a performance venue. The system comprises a booking engine enabling communication between at least two of a performer, a consumer, and a venue agent, the at least two of a performer, a consumer, and a venue agent using at least one client station connected to the booking engine over a communications link. The system also comprises a market module associated with the booking engine for selling performer endorsement entities to at least one consumer and for selecting a particular venue from a group of at least one venue.

57 Claims, 10 Drawing Sheets

OTHER PUBLICATIONS

Ticketmaster p. 1-2 <http://www.ticketmaster.com.>.

Elance Online, pp. 1-3 <http://www.elance.com/c/rfp/main/rfpmkt.pl?catId=10216&rid=BPZZ>.

Localmusic2.com, 1 page, <http://www.localmusic2.com>.

Alanis Morissette, pre-sale tickets, 1 page, <http://www.alanismorissette.com/tickets.html>.

Launch, pp. 1-3, <http://launch.yahoo.com/eagles/>.

<http://www.fairtunes.com/>.

<http://www.npgmusicclub.com/>.

* cited by examiner

Venue Module or Interface 230

Market Module or Interface 240

SYSTEM AND METHOD FOR BOOKING A PERFORMANCE VENUE

FIELD OF THE INVENTION

This invention generally relates to a system and method for booking a performance venue and, more particularly, to a system and method for booking a performance venue using a client station connected to a booking engine over a communications link.

BACKGROUND OF THE INVENTION

We all have enjoyed the thrill and excitement associated with anticipating and attending a live concert or performance. Whether one's preferred music is classical, jazz, rock and roll, heavy metal, Latin, R&B, rap, or country, the process of standing in line for tickets to a favorite act and anxiously awaiting the night of the performance ranks as one of the most exciting and memorable events in one's life. No matter how difficult it may be to secure tickets or how long one has to wait for the night of the show to arrive, these and other burdens and inconveniences are quickly forgotten when one enters the electrified venue and experiences the long-awaited performance.

However, not everyone involved can expect such a positive experience leading up to the performance. The performers, for one, have to deal with, among other things, promoting show dates and securing an attractive venue, all while rehearsing and practicing to ensure a successful and satisfying performance. To make matters worse, the responsibility of promoting ticket sales and attracting a strong and reliable crowd may rest—at least partly, and sometimes completely—on the shoulders of the venue agent, an individual that most performers would agree does not usually have the best interests of the performers in mind. Typically, venue agents represent the venues and thus tend to pursue well-financed, popular acts that historically produce revenue. Indeed, for most performers—particularly local, upstart talents that have yet to achieve fame and fortune—the process of booking a venue and dealing with venue agents can be (and usually is) a frustrating and disappointing experience.

The present day booking process underscores the difficulty local and startup performers encounter in securing a venue. Under the present process, a performer must usually book and confirm a venue three months before the desired performance date. Typically, this involves convincing a venue agent to schedule a performance at a desirable date and time. For well-financed and popular performers, booking a venue does not usually present a problem as most venues are willing to schedule profitable acts. For smaller, local performers, however, the situation is completely different. Because such performers tend to not be well known and lack a reliable fan base, venue agents hesitate in scheduling them out of fear that they will not draw a sufficient crowd, resulting in a financial loss. For those smaller acts that do get scheduled, the venue agent may offer dates and times with little exposure or that are inconvenient to the performer, such as week days or nights or afternoon or early evening hours. Further, a venue agent may require the performer to pay a non-refundable fee before a date and time are offered.

Another problem with the present booking process concerns a venue's handling of ticket sales. Usually, any revenue that is generated from such sales is taken in by the venue on the day or night of the performance. Accordingly, the performer will typically not get paid until after the performance, and then only if there is sufficient revenue remaining after the venue covers its expenses and takes its promised share. It is not unusual therefore for performers to end up empty-handed. Clearly, the present booking process gives venues significant power and leverage when it comes to scheduling performers, particularly when the performers are local and not well-known.

What's more, many venues lack incentives to provide fans and performers with clean and comfortable environments. Realizing that many performers do not have many options as to where they can perform, venues spend little or no money enhancing or renovating their facilities. As a result, this can and usually does result in venues that are less than desirable to fans and performers alike.

Under current booking practices, therefore, performers are at a significant disadvantage because they are not able to present venue agents with an expected fan base or revenue. Thus, there is a need for a booking system and method that empowers performers by enabling them to create a marketable entity—i.e., a fan base—that gives them increased leverage in negotiating and booking performance venues.

Additionally, there is a need for a system and method that enables performers to selectively determine which venue(s) they will engage.

Moreover, there is a need for a system that allows performers, consumers, and venues to interact and communicate in an efficient and reliable manner, and which enhances the booking process for start up performers hoping to build a reliable marketable fan base.

Further, there is a need for a system and method for selling a predetermined number of tickets to consumers before proceeding with negotiating and booking a performance date and time with a venue.

Moreover, there is a need for an effective way for performers to leverage the excitement and enthusiasm of their existing fan base.

SUMMARY OF THE INVENTION

The above-described problems and needs are addressed by the system and method of the present invention. According to one embodiment of the invention, a method for booking a performance venue is disclosed. The method comprises pre-selling at least one performer endorsement entity to a performance using a market module associated with a booking engine to at least one consumer using at least one client station, the at least one client station being connected to the booking engine over a communications link; and selecting a particular venue, using the market module, at which the performance is to take place, the particular venue selected from a group of at least one venue.

In another aspect of the invention, a system for booking a performance venue is disclosed. The system comprises a booking engine enabling communication between at least two of a performer, a consumer, and a venue agent, the at least two of a performer, a consumer, and a venue agent using at least one client station connected to the booking engine over a communications link; and a market module associated with the booking engine for selling performer endorsement entities to at least one consumer and for selecting a particular venue from a group of at least one venue.

In yet another aspect of the invention, a system for facilitating the booking of a venue is provided. The system comprises means for inputting at least one of an expected date, region, and venue size of a performance; means for publishing the expected date and general location of the performance; means for pre-selling tickets for the performance, the tickets being pre-sold directly to at least one consumer by the performer of the performance; and means for selecting at least one venue after a pre-determined number of tickets are sold.

The accompanying drawings, which are incorporated in and constitute a part of this specification, together with the description, serve to explain the principles of the invention.

DETAILED DESCRIPTION OF THE INVENTION

Figure 1:
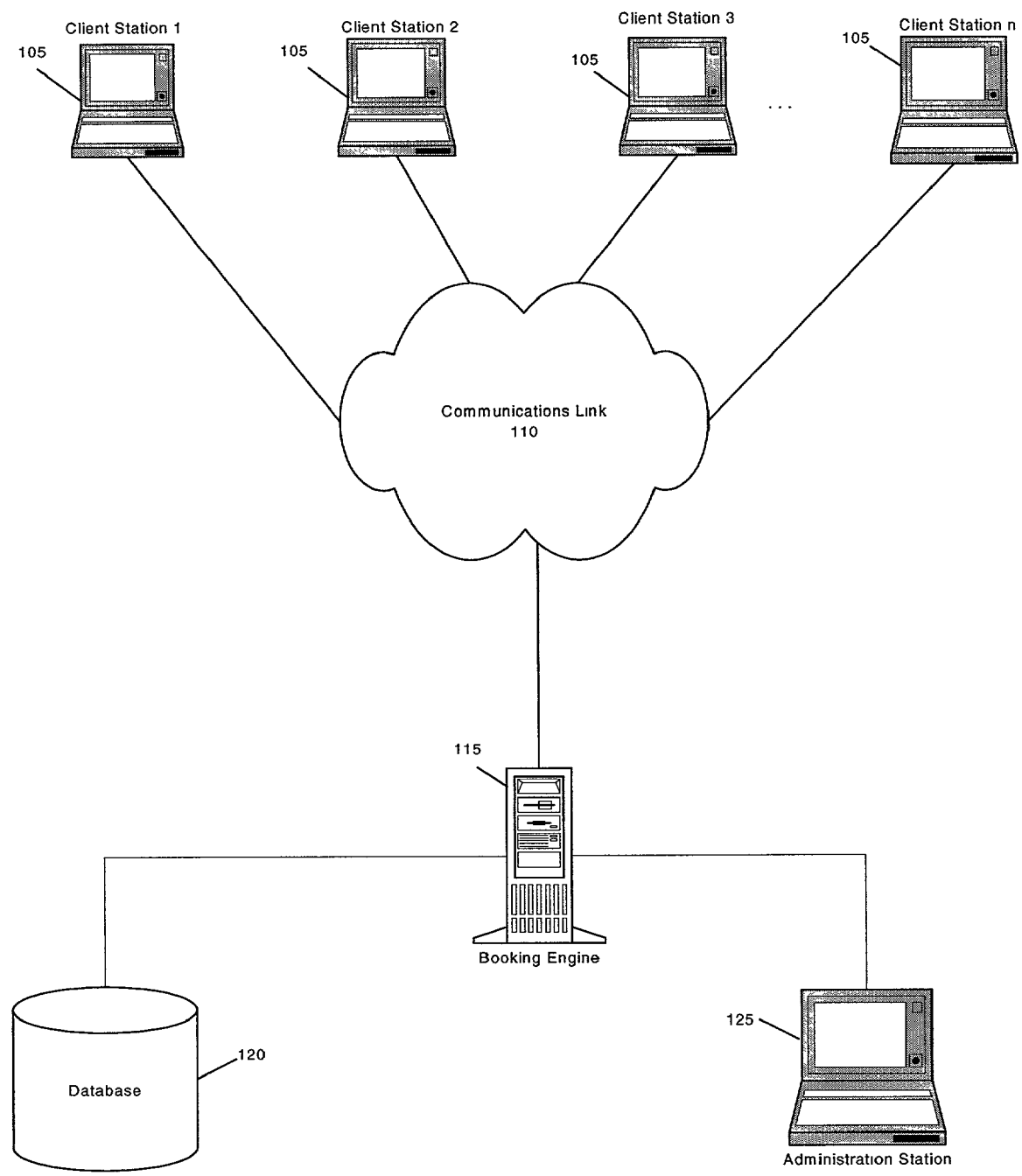
FIG. 1 is a block diagram illustrating one embodiment of a system for booking a performance venue according to the present invention.

Reference will now be made in detail to the present preferred embodiments of the invention, examples of which are illustrated in the accompanying drawings in which like reference numerals refer to corresponding elements.

The present invention is described herein in relation to several modules, each performing a particular task or functionality. Nonetheless, the particularities of each module presented may instead be performed by a greater or lesser number of modules. For example, a single module may be designed to perform all of the functions of the modules described herein, while a plurality of modules may likewise be designed to perform the function(s) of any single module herein described.

The present invention relates to a system and method for booking a performance venue that, among other things, allows for communication and interaction between the various participants of the venue-booking process: the performers, the venues, and the fans (or consumers). Specifically, the system permits performers to sell tickets, coupons, passes, or any other form or type of admission product or performer endorsement entity, directly to their fans without having to first schedule and confirm a performance date with a specific venue. Normally, a performer is required to book a venue before selling tickets to its fans, a process that creates significant obstacles to smaller, lesser known performers lacking an established fan base and ready access to capital. By using the system and method of the invention, the performer is able to pre-sell tickets to fans and thereby generate a fan base and revenue before engaging a venue, and is thus better able to promote and market itself as a reliable and revenue-producing act. Thus, a performer may be able to selectively determine which venue will host its performance, as opposed to having to depend on a venue's discretion. In one embodiment, the invention may empower performers by permitting them to create a marketable entity (i.e., a fan base) that can subsequently be used to leverage negotiation of an agreed performance schedule. In one embodiment, the performer may select a venue of its choice, which may be a traditional venue such as a local arena, club, bar lounge, concert hall, or any non-traditional venue that is able to hold the anticipated number of fans, such as an open field, restaurant, private home, etc. According to one embodiment, the performer may select a venue depending on its featured amenities, location, or any other attributes that may appeal to the performer. In another embodiment, the performer may solicit bids from several venues and thereafter select the venue offering the most attractive bid. Other venue selection protocols are possible.

According to another embodiment, the present invention may be used by a performer to sell a pre-determined number of tickets before marketing itself to venues and before selecting a particular venue at which to hold the performance. For instance, a performer may desire to sell tickets until such time as 75% of a desired venue's capacity is achieved. In this way, the performer may attract a sufficient fan base and level of revenue that it may then market and present to the desired venue. The desired venue may then appreciate the performer's ability to generate revenue—as evidence by the total pre-sold tickets—and is thus more likely to schedule the performer at the desired date and time. Moreover, the venue may also infer from the pre-sold tickets an enhanced ability to achieve higher levels of concession and other merchandise sales. For example, the venue may predict that it will sell a certain amount of concessions and merchandise in light of the expected attendance at the performance.

According to one embodiment, the present invention may allow a performer a predetermined period of time before the set performance date within which to achieve a predetermined amount of ticket sales. In one embodiment, if the predetermined number of tickets is not sold, the performer may have to cancel the planned date and schedule a different performance date. In another embodiment, the purchased tickets may be extended for an additional period of time to accommodate the rescheduled date. For instance, assume a fan purchases a ticket for a show scheduled for an initial date. Assume further that the performance is canceled by the performer because of a lack of sufficient ticket sales. The performer may then reschedule the performance for a second date, and the fan may be offered the ability to commit to the second date. This way, the performer may develop and maintain its fan base.

In another embodiment, the present invention may be used to increase the booking capability and leverage of performers. Specifically, the present invention may be used by performers to schedule their performances at more desirable dates and times. For instance, because the performer pre-sells tickets directly to its fans, the performer may be able to attract more interest from potential venues. Consequently, the established fan base may be leveraged to permit the performer to have more say as to the date and time which the performance will take place, thus making previously impossible dates and times more readily available to performers. For example, a performer may choose to schedule a performance at a venue on Saturday night from 6 pm to 9 pm, before the club fills up with an otherwise "normal" audience, who will come see their normally scheduled event starting at the "normal" time of about 10 PM. In this way, the performer (and the venue) may take advantage of greater space availability during non-peak times and thereby generate a greater overall fan base and revenue. Venues may then be able to schedule back-to-back performances, for example, and would be able to have sold-out shows throughout the night, thereby maximizing their return on their venue investment.

In one embodiment, the present invention may also be used to sell special forms of tickets, coupons, passes, vouchers, or other performer endorsement entities or products that meet the needs of individual consumers. In one embodiment, the present invention may be used to offer fans or consumers bulk ticket packages. In another embodiment, the present invention may offer single tickets that correspond to a designated performer or performance. In another embodiment, a reward system may be provided that recognizes a consumer's level of support to a particular performer. For example, the consumer may be awarded or granted a designation or number that indicates the consumer's level of commitment to a performer. The designation number may then be used to give the performer priority in future shows, or to present the consumer with bonus rewards, discounts, or other incentives. A consumer may be given a designation or number on a per-performer basis, or may be given a designation or number corresponding to any and all performers. In another embodiment, the invention may provide passes that allow consumers to reserve tickets to any performance based on certain booking privileges. In another embodiment, the invention may allow the pre-selling of standby tickets or passes that permit a consumer to attend any performance having space available a predetermined period of time prior to the performance date and time. Such standby passes or tickets may be made available to consumers as part of an incentives or bonus program.

According to another embodiment of the present invention, performers may market or promote themselves to fans and venues by providing electronic files of their music. For example, a local performer may make available MP3 files of its music or performances to its fans so that they may become better acquainted with the performer's style and sound. Similarly, venues may determine whether its reputation will fit well with the style of music of the performer, e.g. a loud heavy metal band would probably not be appreciated at an outdoor amphitheater located in a residential area. In another embodiment, the music may be provided to fans at the time they register, when they pre-purchase tickets or other items, or when simply browsing through the system.

Performers may also use the revenue generated from the pre-sold tickets to refine their craft at a more professional and marketable level. What's more, the revenue generated by the pre-sold tickets may even permit the performer to hire more professional production assistance, i.e., studio staff, engineers, producers, etc. In another embodiment, the invention may be used by a performer to further generate and enhance their fan base. Because a performer selects the date of their next performance upfront, it is possible to select a distant date—say 1 year into the future—and thereafter watch the fan base grow as fans become more familiar with the performer's sound and style. During this time, the performer may comfortably generate revenue and/or market itself without having to involve a venue, and can thus concentrate its efforts on developing music, rehearsing its performances, or any other like engagements.

The system and method of the invention may also be used by venues. For instance, the invention allows a venue to not concern itself with the possibility that a performance will not draw sufficient revenue and therefore result in a financial loss. Because performers come forward with pre-sold tickets, the venue may anticipate a high attendance rate, or at least a sufficient number of fans and customers to make the performance more profitable. Such predictable attendance may further result in enhanced concession and novelty sales within the venue. Indeed, in one embodiment, the venue may arrange with the performer to provide for the pre-selling (or bundling) of concessions and novelties with the sale of tickets. In one embodiment, a venue may use the invention to provide comprehensive information about itself. The information may then be accessed by performers and fans who are interested in learning more about the venue. In one embodiment, information from various venues may be compiled into a list that profiles the venues and can be used by performers and fans to compare venues.

The system and method of the invention may also be used by fans. Specifically, a fan is able to pre-purchase tickets directly from a performer (or a third party). In so doing, the fan may avoid paying additional venue charges or fees that may typically be encountered. Further, the invention may allow fans to purchase other merchandise related to the performer or the venues in which they will perform. For example, a fan may opt to buy tickets to a concert that will be taking place next month, and may further opt to purchase along with the ticket clothing bearing the performer's name or logo, such as a t-shirt, bandana, head gear, etc. Similarly, the fan can pre-purchase other memorabilia of the concert or performer, such as pins, jewelry, calendars, tour guides, promotional materials, CDs, etc.

In another embodiment, the invention may be used to enable a performer to market itself and to pre-sell tickets to consumers. In one embodiment, revenue generated by the ticket sales may be received by a third party administrator that may arrange with the performer to provide periodic payments based on the revenue generated. For instance, the administrator may present the performer with a monthly check for an amount equal to the total ticket sales during the preceding month. In another embodiment, the administrator may retain a certain percentage of the revenue as a service fee.

In another embodiment, the present invention may be used to: produce and maintain statistics and rankings concerning various performers, venues, and performances; provide incentive programs to fans or reward them for performer or venue loyalty, such as "cashback" bonuses, performer referral bonuses, and high attendance level bonuses; produce and maintain data and demographic information services to assist performers in evaluating fan base demographics; auction tickets to fans; permit venues to bid on the performances; provide management tools to assist performer in building income/ticket sales; and provide performer development assistance, tips, advice, etc.

FIG. 1 is a block diagram illustrating one embodiment of a booking system 100 for booking a performance venue according to the present invention. The booking system 100 may include client stations 105, communications link 110, booking engine 115, database 120, and administration station 125. According to one embodiment, booking system 100 may be part of a standard network (such as the Internet) composed of a client-server relationship between client stations 105 and booking engine 115. In this embodiment, users of client stations 105 may log on and access information and functionality available on or via booking engine 115. In another embodiment, users may be required to enter specific information before access to booking engine 115 is granted. For instance, a user may be required to enter a username and password code that allow for proper identification of the user. In another embodiment, the username and password or code may allow for a personalized user experience.

In one embodiment of the present invention, client stations 105 may be used by users such as performers, venue agents, or fans to access the various functionalities associated with booking engine 115 which, in one embodiment, relate to booking of a performance venue. In one embodiment, the various functionalities may be accessed by users via an interface, such as a website or web page hosted by engine 115 having links to other functionality, modules or interfaces. Performers may access client stations 105 to input information about upcoming performances. The performer may also use client stations 105 to market itself to fans and venues by providing promotional information, such as the performer's history or biography, musical influences, style of music, past performances, and sample or complete copies of its music in electronic file format, such as MP3, for example. According to one embodiment, the performer may input the dates corresponding to upcoming performances, the cost per ticket, as well as any other information that may be useful to a fan considering attending the show or to a venue considering hosting the show. In one embodiment, the information inputted by the performer may be published to fans on a website or web page, or may instead be provided to individual fans via electronic mail or posting, or may be sent via standard mail or overnight delivery or shipment. According to one embodiment, performers may log on to the URL address of a website hosted by booking engine 115 and execute the various functionalities described herein, which, in one embodiment, may be represented by individual modules or applications associated with booking engine 115 and/or database 120. In one embodiment, performers may use client station 105 to register with system, update its profile, and manage its account, for example.

Fans or consumers may use client stations 105 to inquire about upcoming performances, check on the performance schedules of specific performers, purchase tickets to performances, purchase merchandise or other items related to the performers or the venues, download music from the performers, take part in promotional events, interact with specific performers and venues and other fans, access information related to particular performers or venues, provide comments of feedback about performers, performances, or venues, etc. According to one embodiment, consumers may log on to the URL address of a web site hosted by booking engine 115 and execute the various functionalities described herein which, in one embodiment, may be represented by individual modules or applications associated with booking engine 115 and/or database 120. In one embodiment, a consumer may use client station 105 to register with the system, update worker profile, and manage his or her account, for example.

Venues and venue agents can use client station 105 to interact with system 100 and with performers during the booking process, and to become more familiar with the performers and their music. In one embodiment, venues may market themselves to performers via client station 105 to enhance their chances of being selected as the venue of choice. In another embodiment, venues may check on the progress of ticket sales for particular performers to get a sense of those performances that may provide sufficient revenue and value. According to one embodiment, venues may log on to the URL address of a website hosted by booking engine 115 and execute the various functionalities described herein which, in one embodiment, may be represented by individual modules or applications associated with booking engine 115 and/or database 120. A venue may also use client station 105 to register with the system, update its profile, and manage its account, for example.

Client stations 105 may include, for instance, a personal or laptop computer running a Microsoft Windows™ 95 operating system, a Windows™ 98 operating system, a Millenium™ operating system, a Windows NT™ operating system, a Windows™ 2000 operating system, a Windows XP™ operating system, a Windows CE™ operating system, a PalmOS™ operating system, a Unix™ operating system, a Linux™ operating system, a Solaris™ operating system, an OS/2™ operating system, a BeOS™ operating system, a MacOS™ operating system, a VAX VMS operating system, or other operating system or platform. Client stations 105 may include a microprocessor such as an Intel x86-based or Advanced Micro Devices x86-compatible device, a Motorola 68K or PowerPC™ device, a MIPS device, Hewlett-Packard Precision™ device, or a Digital Equipment Corp. Alpha™ RISC processor, a microcontroller or other general or special purpose device operating under programmed control. Client stations 105 may further include an electronic memory such as a random access memory (RAM) or electronically programmable read only memory (EPROM), a storage such as a hard drive, a CDROM or a rewritable CDROM or another magnetic, optical or other media, and other associated components connected over an electronic bus, as will be appreciated by persons skilled in the art. Client stations 105 may be equipped with an integral or connectable cathode ray tube (CRT), a liquid crystal display (LCD), electroluminescent display, a light emitting diode (LED) or another display screen, panel or device for viewing and manipulating files, data and other resources, for instance using a graphical user interface (GUI) or a command line interface (CLI). Client stations 105 may also include a network-enabled appliance such as a WebTV™ unit, a radio-enabled Palm™ Pilot or similar unit, a set-top box, a networkable game-playing console such as a Sony™ Playstation™, Sega™ Dreamcast™ or a Microsoft™ XBox™, a browser-equipped or other network-enabled cellular telephone, or another TCP/IP client or other device.

As shown in FIG. 1, client stations 105 are connected to a communications link 110. The communications link 110 may be, include or interface to any one or more of, for instance, the Internet, an intranet, a Personal Area Network (PAN), a Local Area Network (LAN), a Wide Area Network (WAN) or a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, V.34 or V.34bis analog modem connection, a cable modem, an Asynchronous Transfer Mode (ATM) connection, or a Fiber Distributed Data Interface (FDDI) or Copper Distributed Data Interface (CDDI) connection. The communications link 110 may further include or interface to any one or more of a Wireless Application Protocol (WAP) link, a General Packet Radio Service (GPRS) link, a Global System for Mobile Communication (GSM) link, a Code Division Multiple Access (CDMA) or Time Division Multiple Access (TDMA) link such as a cellular phone channel, a Global Positioning System (GPS) link, cellular digital packet data (CDPD), a Research in Motion, Limited (RIM) duplex paging type device, a Bluetooth, BlueTeeth or WhiteTooth radio link, or an IEEE 802.11 (Wi-Fi)-based radio frequency link. The communications link 110 may further include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

Also connected to the communications link 110, and thereby accessible to performers, venue agents, or consumers units using stations 105, is booking engine 115. Booking engine 115 may host one or more applications, modules, or interfaces that function to permit interaction between the performers, for example, and its fans and potential performance venues. The booking engine 115 may include, for instance, a workstation running the Microsoft Windows™ XP Operating System™, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

Users such as performers, venue agents or consumers may access the booking engine 115 via the communications link 110 using a client station 105. As was mentioned above, interaction between the system 100 of the invention and users permits, among other things, the direct sale of tickets and other items between performers and fans. Further, the system 100 permits, among other things, interaction between performers and venue agents as regards the venue-selection process which may follow pre-selling of tickets by a performer to its fans, for example. In one embodiment, identification of a user may be determined automatically by the system 100 based on the user's IP address or other similar identifier, or may be based on log-in data or information provided by the user, such as the user's predetermined user name and a password. Other information may be used to personalize the session. Personalized interaction may provide a performer, venue, or consumer with personalized interfaces that enhance user experience and communication.

Information generally relied on by the system 100, and more particularly by booking engine 115, may be stored in a database 120, as shown in FIG. 1. The database 120 may include or interface to, for example, an Oracle™ relational database sold commercially by Oracle Corporation. Other databases, such as an Informix™ database, Database 2 (DB2) database, a Sybase™ database or another data storage or query format, platform or resource such as an On Line Analytical Processing (OLAP) data storage facility, a Standard Query Language (SQL) data storage facility, a storage area network (SAN) facility, or a Microsoft Access™ database or other similar database platform or resource. The database 120 may be supported by a server or other resources, and may include redundancy, such as a redundant array of independent disks (RAID), for data protection. For example, the database 120 and the booking engine 115 may comprise an OLAP system that generates a plurality of userspecific reports from data maintained by the database 120. In another example, the booking engine 115 may be associated with or connected to a database server (not shown) that serves to present queries against the database 120. The database server may comprise an OLAP server system for accessing and managing data stored in the database 120. The database server may also comprise a Relational On Line Analytical Processing (RO-LAP) engine, a Multi-dimensional On Line Analytical Processing (MOLAP) engine, or a Hybrid On Line Analytical Processing (HOLAP) engine according to different embodiments. Specifically, the database server may comprise a multithreaded server for performing analyses directly against the database 120.

Information stored in booking engine 115 or database 120 may be input and administered by an administrator of the system 100, for example, via an administration station 125. Information entered by the administrator may, in one example, correspond to information about special features or events being presented through the system 100, or information regarding new or upcoming functionality that will be added. In addition, the administrator may also administer data corresponding to the performers, venues, and consumers that are registered with the system. Moreover, the administrator may modify, edit, or update the module, functionalities or interfaces associated with system 100 and booking engine 115. In another embodiment, the administrator may use station 125 to correspond with registered users of the system 100 and to provide relevant information concerning their registration, status of the system 100, and upcoming events/features, for example. Access to system 100 via administration module 125 may, in one embodiment, be limited to authorized users only, such as by requiring a username and password or code.

Figure 2:
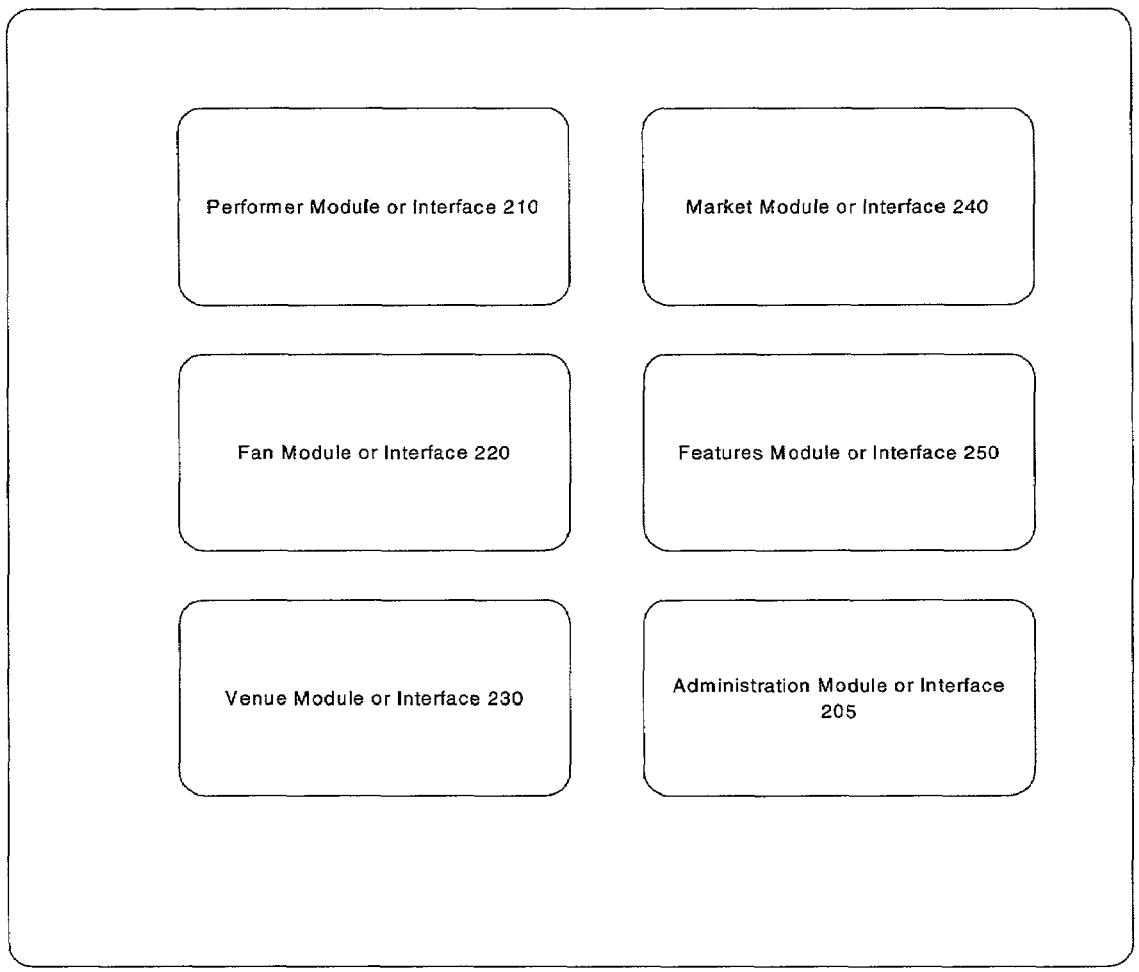
FIG. 2 is a block diagram of one embodiment of a booking engine according to the present invention.

FIG. 2 illustrates the booking engine 115 in more detail. As shown, the booking engine 115 may include an Administration Module or Interface 205 that may be accessed by the system administrator via the administration station 125 to monitor or control operation of the system 100, or to create, input or update information stored in the database 120, such as user information, application or system 100 functionality, etc. The administration module 205 may also be used by a system representative to monitor the overall system 100 operation. For instance, the administrator may monitor user participation, and user response patterns. In one embodiment, booking engine 115 may also include one or all of a Performer Module or Interface 210, a Fan Module or Interface 220, a Venue Module or Interface 230, Market Module or Interface 240, and Features Module or Interface 250.

Figure 3:
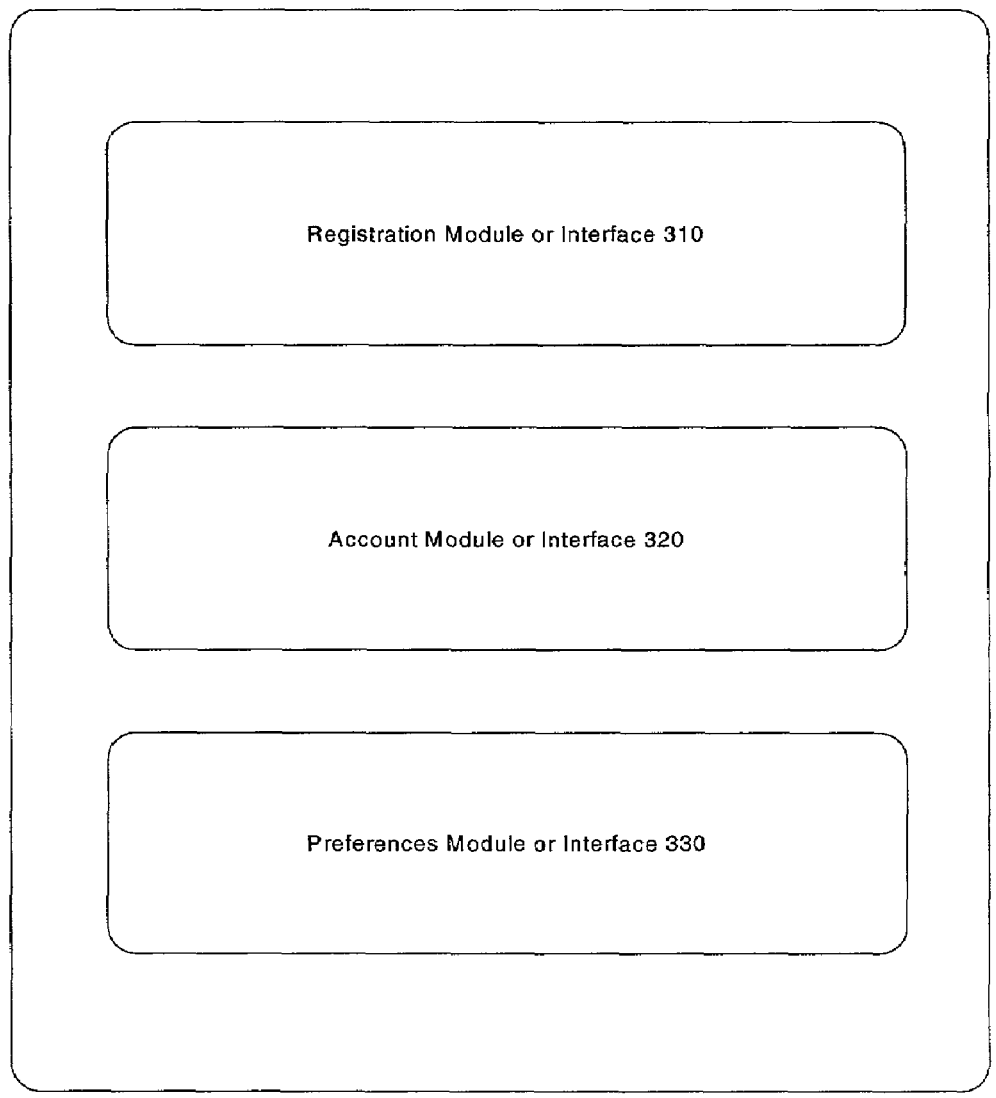
FIG. 3 is a block diagram of one embodiment of a performance module according to the present invention.

FIG. 3 illustrates Performer Module or Interface 210 in more detail. In one embodiment, Performer Module or Interface 210 comprises a website or web page that presents a performer with links to relevant functionalities relating to the pre-selling of tickets to consumers, or to the selection of a desired venue, for example. In one embodiment, Performer Module or Interface 210 may be accessed by performers to enable interaction with the various features and applications available through system 100. For instance, in one embodiment, Performer Module or Interface 210 may include a Registration Module or Interface 310 that queries the performer for registration information required for authorization to use and access the system 100. For example, registration information may include the performer's name, the name of the band and other members, the type of music the performer plays, the names of albums and songs written and composed by the performer, and any other information that may be useful to fans and venues during the ticket purchasing and venue selection process. In one embodiment, the information provided by the performer may then be stored within database 120, and subsequently related to interested fans and venues that may desire to learn more about the particular performer. In one embodiment, Registration Module or Interface 310 may comprise a website or web page. In another embodiment, Registration Module or Interface 310 may comprise an application module or sub-routine.

In another embodiment, Performer Module or Interface 210 may also include an Account Module or Interface 320 that enables a performer to enter information related to upcoming performances and other performer-related information. Account Module or Interface 320 may also be accessed by performers to input information and details about upcoming performances for which the performer would like to sell tickets, the total number of tickets to be sold, special or promotional items and merchandise to be sold at the performance, other e-commerce retail, etc. For instance, Account Module or Interface 320 may query the performer for the date and time of the performance, the expected venue size needed or desired to stage the performance, as well as a brief description of the performance, such as the type of music that will be played, for example. In one embodiment, Account Module or Interface 320 may also be used to input or upload information such as electronic files of the performer's music which may then be accessed or downloaded by fans or venues. Other performer-information may be input.

In another embodiment, Performer Module or Interface 210 may also include a Preferences Module or Interface 330 that allows the performer to input information that may be of interest to venues and venue agents soliciting performances. For example, a performer may indicate that he prefers that smoking not be allowed during his performance, or that no video or audio recording be conducted during his performances, etc. Performers may also indicate their preference as to whether or not food should be served during their performance. Performers may also designate certain features or amenities that they desire during their performance. In one embodiment, a performer may enter information or comments relating to the various venues such as, for example, ranking or rating of the venues that may subsequently be modified, and/or accessed by other performers, fans, and venues.

Performer Module or Interface 210 may also provide performers with information related to the venue booking process of the invention. For instance, performers may receive information related to other artists, the locations and sizes of venues within close proximity of the performer's home town or city, booking information, statistics on ticket purchases and fan preferences, press reports on upcoming performances and performers, etc. Performers may also access information such as fan and venue rankings and ratings of the various performers and performances, as well as correspondence from and to the various fans, other performers, and venues.

Figure 4:
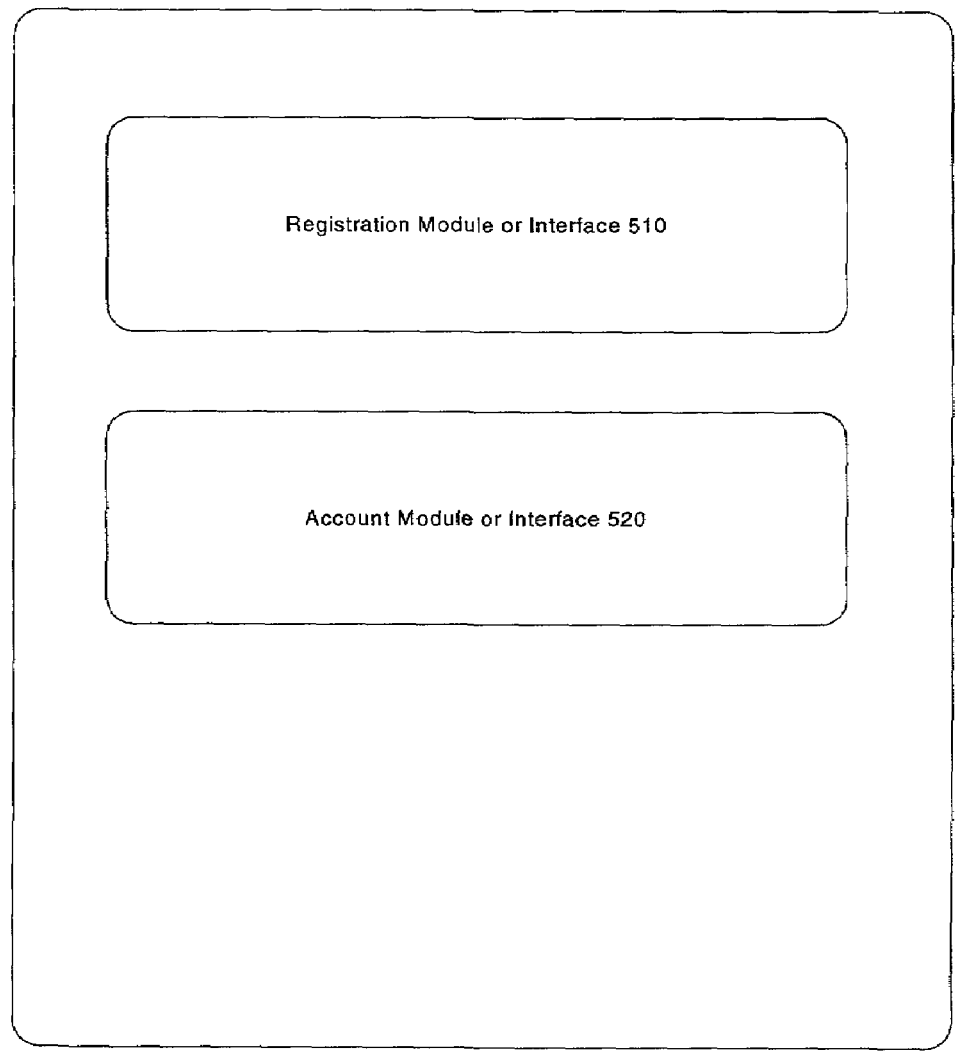
FIG. 4 is a block diagram of a fan module according to the present invention.

FIG. 4 illustrates Fan Module or Interface 220 in more detail. In one embodiment, Fan Module or Interface 210 comprises a website or web page that presents a fan or consumer with links to relevant functionalities relating to the purchasing of tickets from performers, for example. In one embodiment, Fan Module or Interface 220 may be accessed by fans to enable interaction with the various features and applications available through system 100. For instance, in one embodiment, Fan Module or Interface 220 may include a Registration Module or Interface 510 that queries the fan for registration information required for authorization to use and access the system 100. For example, registration information may include the fan's name, home address, electronic mail address, telephone number(s), financial instrument information such as credit card or debit card account number, and any other information that may be desired. In one embodiment, the information provided by the fan may then be stored within database 120, and subsequently related to performers and venues from whom the fan has purchased performance tickets and/or merchandise. In one embodiment, Registration Module or Interface 510 may comprise a website or web page. In another embodiment, Registration Module or Interface 510 may comprise an application module or sub-routine providing the requisite functionality.

In another embodiment, Fan Module or Interface 220 may also include an Account Module or Interface 520 that enables a fan to enter personalized information, such as those upcoming performances that the fan is interested in attending or the performers for whom the fan would like further information. In one embodiment, the fan may enter the name of the performer(s) he or she is interested in seeing. In another embodiment, the fan may indicate an interest in being notified of all jazz performers announcing performance dates in the fan's city anytime in the upcoming year, for example. Other personalized information may be entered. Account Module or Interface 520 may also be accessed by fans to input information and details about tickets the fan would like to buy. For instance, Account Module or Interface 520 may query the fan for the number of tickets the fan will generally require, whether the fan would like to purchase other items, merchandise, or concessions along with their tickets, etc. In one embodiment, a fan may enter information ranking or rating the performers, performances, or venues, as well as submit or access correspondence to or from performers, venues, or other fans.

Account Module or Interface 520 may also provide a fan with information about his or her past transactions and/or purchases. For instance, a fan may view all tickets purchased using system 100, the names of all performers the fan has seen perform, the titles of all songs that the fan has downloaded, the performances for which tickets have been reserved, the refunds obtained through use of the system 100, etc. In one embodiment, a fan may manage his or her account, and may update settings or indications previously provided. In one embodiment, Account Module or Interface 520 may comprise a website or webpage. In another embodiment, Account Module or Interface 520 may comprise an application module or sub-routine providing the requisite functionality.

Fan module or Interface 220 may also provide fans with information related to the venue booking process of the invention. For instance, fans may receive information related to other fans, the various performers, performances, and venues. Fans may also access information such as fan and venue rankings and ratings of the various performer and performances, as well as correspondence from and to the various fans, performers, and venues.

Figure 5:
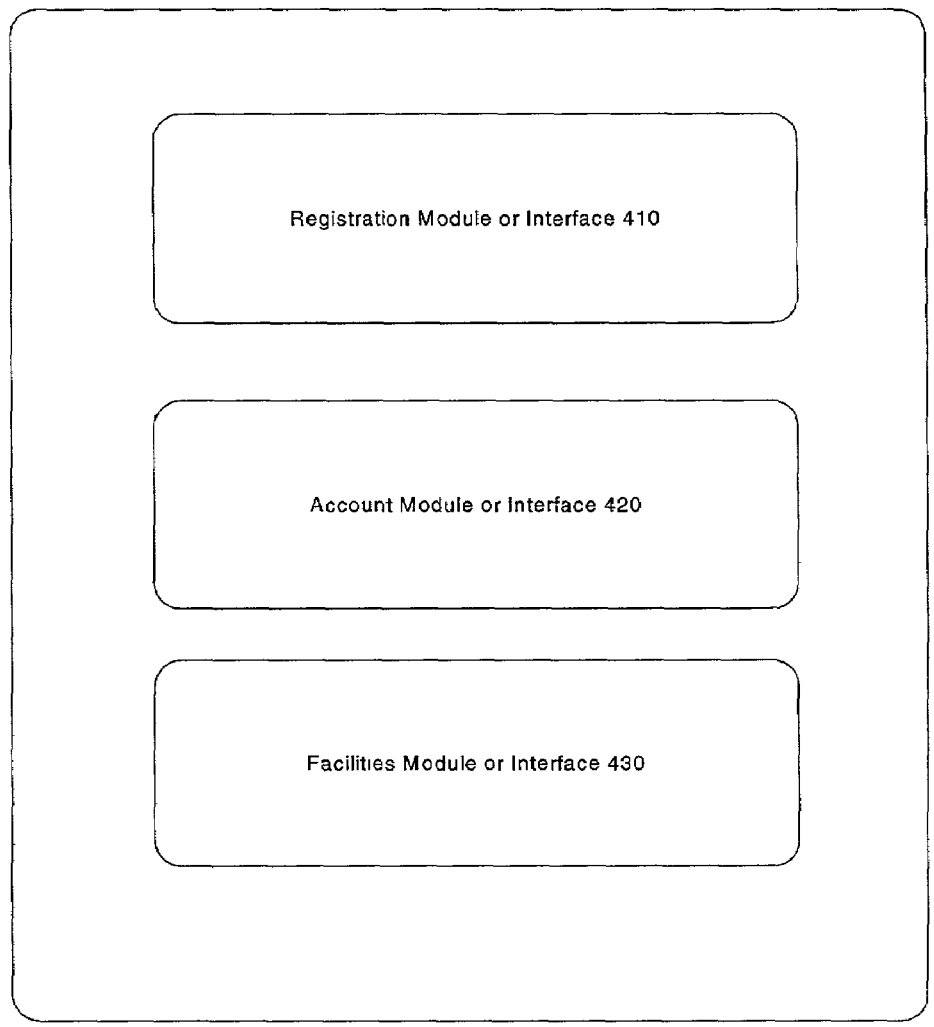
FIG. 5 is a block diagram of a venue module according to the present invention.

FIG. 5 illustrates Venue Module or Interface 230 in more detail. In one embodiment, Venue Module or Interface 230 comprises a website or web page that presents a venue with links to relevant functionalities relating to the pre-selling of tickets and merchandise to consumers, or to the selection of a desired venue, for example. In one embodiment, Venue Module or Interface 230 may be accessed by venues to enable interaction with the various features and applications available through system 100. For instance, in one embodiment, Venue Module or Interface 230 may include a Registration Module or Interface 410 that queries the venue for registration information required for authorization to use and access the system 100. For example, registration information may include the venue's name, address, telephone number(s), electronic mail address, website or web page address, agent names, and any other information that may be useful to performers and fans during the ticket purchasing and venue selection process. In one embodiment, the information provided by the venue may be stored within database 120, and subsequently related to interested fans and performers that may desire to learn more about the particular venue. In one embodiment, Registration Module or Interface 410 may comprise a website or web page. In another embodiment, Registration Module or Interface 410 may comprise an application module or sub-routine providing the requisite functionality.

In another embodiment, Venue Module or Interface 230 may also include an Account Module or Interface 420 that enables a venue to enter information related to scheduling and availability information that may be of interest to performers or fans. For instance, Account Module or Interface 420 may be accessed by venues to input information and details about specific dates and times on which space is available or not available. In one embodiment, venues may input statistical or performance information, such as total past attendance, past performances, upcoming performances, the name of upcoming performers, historical performances and performer revenue, etc. In one embodiment, a venue may use Account Module or Interface 420 to access information about its past transactions and performances scheduled. For instances, a venue can determine what performers have been scheduled, how many times a performer has played at the venue, how many fans have attended, etc. In one embodiment, Account Module or Interface 420 may comprise a website or webpage. In another embodiment, Account Module or Interface may comprise an application module or sub-routine providing the requisite functionality.

In another embodiment, Venue Module or Interface 210 may also include a Facilities Module or Interface 430 that allows the venue to input information regarding its facilities. For example, a venue may indicate space limitations of its facilities, such as seating capacity and area, and concession and retail capabilities. Venues may also input other relevant information such as parking capacity, and lighting and sound capabilities. Venues may also designate certain features or amenities that they offer to fans and performers, such as food and drink menus, special promotions, etc. Other facility information may be input.

Figure 6:
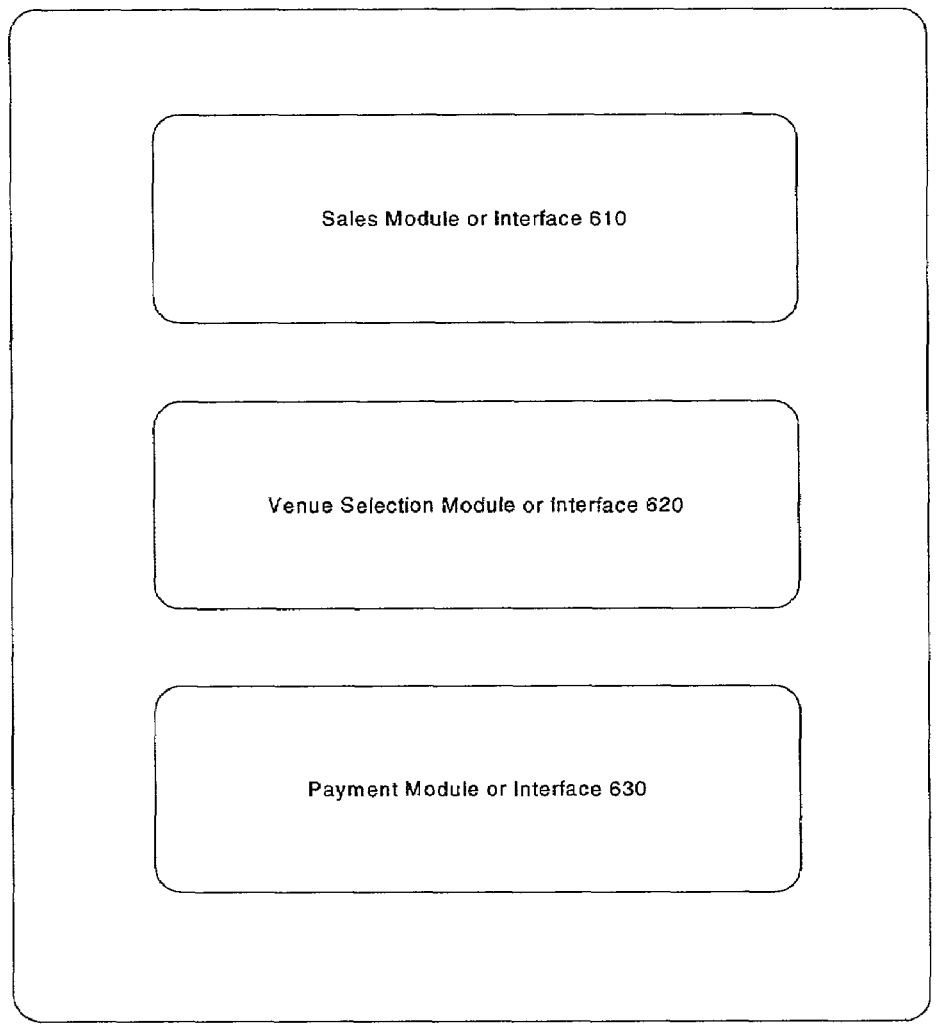
FIG. 6 is a block diagram of a market module according to the present invention.

FIG. 6 illustrates the Market Module or Interface 240 in more detail. In one embodiment, Market Module or Interface 240 enables interaction between performers, fans, and venues as it relates to selling of tickets and other items and merchandise, and the booking of performance venues. In one embodiment, Market Module or Interface 240 comprises a website or web page that presents a performer, fan, or venue with links to various functionalities relating to the pre-selling of tickets and merchandise to consumers, and to the selection of a desired venue. In one embodiment, Market Module or Interface 240 may include a Sales Module or Interface 610 wherein all upcoming performances are posted for fans and venues to browse. In one embodiment, a performer may publish the expected date of the performance, and the expected venue size needed, for example. In one embodiment, fans and venues can access specific performances based on specified search criteria or limitations such as, for example, performances within a specific zip code, city, or state. In another embodiment, performances can be accessed based on the performer's name or music style. Other search criteria are possible.

According to another embodiment, Sales Module or Interface 610 may present the types of tickets, coupons, passes, vouchers, or other performer endorsement entity or products that fans can purchase to the various performances. In one embodiment, a performer may offer fans several forms of tickets, each form offering particular features and services. For instance, a performer may offer bulk ticket packets, single tickets to specific performances, reward, or incentive programs that recognize a consumer or fan's level of support for a particular performer. In one embodiment, the consumer may be awarded or granted a designation number that indicates or corresponds to the consumer's level of commitment to the performer. The designation number may then be used to give the performer priority in future shows, or to present the consumer with bonus rewards, discount, or other incentives. In another embodiment, Sales Module or Interface 610 may also be used to enable fans to pre-purchase food and drink, for consumption on the day of the performance. Similarly, a fan can pre-purchase merchandise such as clothing or other items that can be picked up the night of the performance. This way a fan can avoid the hassle of carrying excessive amounts of cash in a crowded venue.

In another embodiment, Market Module or Interface 610 may include a Venue Selection Module or Interface 620 that enables interaction between performers and venues. In one embodiment, venues can post their availability on particular dates and times, as well as space and capacity limitations that may be of interest to performers. In one embodiment, performers can browse the various venue postings and select the venue(s) that offer the best facilities, price, location, amenities, etc. In another embodiment, the performer may conduct an auction and allow the different venues to present a bid which includes, in one embodiment, the venue's charge for scheduling the performance, as well as other features and amenities the venue may offer performers and fans. In one embodiment, the performer may select the venues it would like to include in the auction. The selected venues may then submit their bids via Venue Selection Module 610 for consideration by the performer.

In one embodiment, Market Module or Interface 240 may also include a Payment Module or Interface 630 that enables transactions relating to the payment of tickets and or venues space, for example. In one embodiment, Payment Module or Interface 630 receives electronic payment from a consumer via a financial instrument, such as a credit or debit card, or a checking or savings account and routing number. In another embodiment, a performer may make payment to the selected venue(s) in like manner. In one embodiment, payment from a consumer may be received by a third party such as the administrator or owner of the system 100. Such administrator or owner may arrange for periodic payment of the revenue received to the appropriate performer, such as via monthly paychecks. In another embodiment, fans, performers, and venues registered with system 100 may maintain an account associated with Payment Module or Interface 630 to facilitate the payment clearance process.

In another embodiment, the invention may be used to market, sell, or distribute various forms of tickets, coupons, passes, vouchers, or other performer endorsement entities or products that meet the needs of individual consumers. In one embodiment, the invention may further be used to sell a collection of tickets or passes, each one having particular feature(s) and value. In one embodiment, the invention may be used to sell a performer pass, a flexible pass, or a standby pass, for example.

A performer pass may correspond to a specific performer and may be used by the purchasing fan to gain admission to performances by such performer. In one embodiment, the performer pass may comprise a pre-purchased ticket that associates the purchasing fan as a dedicated fan of the performer. In one embodiment, a fan may purchase a performer pass via system 100, and more specifically via Market Module or Interface 240. In this embodiment, a performer pass may be printed by the purchasing fan on a printer (not shown) associated with client station 105, for example, or may be picked up by the fan at the venue on the date of the performance, i.e., will call. In one embodiment, a performer pass may comprise a single admission ticket that permits the purchasing fan to gain admission to a performance upon presenting it at the door of the venue.

In another embodiment, a performer pass may provide the purchasing fan with privileges, such as first access to admission tickets, or the ability to reserve a single ticket or a block of tickets to a performance, for example. For instance, the fan purchasing a performer pass may be permitted a period of time—a performer pass booking window, for example—during which he or she may reserve a specified number of tickets to a particular performance. In one embodiment, the performer pass booking window may commence on the date the performance date is published and may end on a predetermined date prior to the performance date, such as the booking date, which is the date the performer and the venue agree on a performance date and time, for example. In another embodiment, the performer pass booking window may expire on the commencement date of a standby pass booking window, as explained below. In one embodiment, a performer pass may remain exclusive throughout the performer pass booking window, thereby enabling the holder of the performer pass to get first access privileges. In another embodiment, a performer pass may be offered individually or as part of a package, such as a 2-pack, 3-pack, 4-pack, or 6-pack, for example. In another embodiment, the cost or price of a performance pass may depend on the demand for the particular performer in a given area. In another embodiment, any difference between the price paid for a performer pass(es) and the actual cost of admission to a particular performance may be automatically deducted or added to the purchasing fan's account with system 100, for example. In one embodiment, money spent on purchasing performer passes may be used to provide the purchasing fan with additional incentives and bonuses.

According to another embodiment, a performer pass may expire if not used by the purchasing fan within a certain period of time. This feature permits performers to better anticipate the size of their fan base, and thus better estimate the venue size needed for upcoming performances. For instance, a performer pass may expire after a specified period of time after its purchase date, such as 2 months, for example. In this example, the purchasing fan may either use the performer pass as an admission ticket to a desired performance, or make a reservation during the performer pass booking window for upcoming performances, for example. If the performer pass comprises a package, such as a 6 pack, for example, then each of the passes comprising the package may expire after a certain period of time. Therefore, in the example of a 6-pack of performer passes, each of the 6 passes may have a 2-month period during which it must be used. This way, the purchasing fan has, in effect, twelve sequential months of performer pass privileges and benefits. In another embodiment the individual passes making up a package expire sequentially in order to avoid bundling of passes at the end of a package period. According to another embodiment, a fan must have a valid (i.e., not expired) performer pass in order to receive incentives or benefits or to purchase other forms of passes, tickets, coupons, vouchers, or other performer endorsement entity.

A flexible pass may also be used by a purchasing fan to gain admission to or reserve tickets to performances offered by a performer. Unlike the performer pass, however, the flexible pass does not, in one embodiment, associate the purchasing fan with a particular performer. Rather, a flexible pass holder may use the pass to attend the shows or performances of any performer. In one embodiment, a fan may purchase a flexible pass via system 100, and more specifically via Market Module or Interface 240. In this embodiment, a flexible pass may be printed by the purchasing fan on a printer (not shown) associated with client station 105, for example, or may be picked up by the fan at the venue on the date of the performance, i.e., will call. In one embodiment, the flexible pass may comprise a pre-purchased ticket. In another embodiment, a flexible pass offers its purchaser reservation-level access to the booking process. In another embodiment, a fan must have at least one performer pass in order to be able to purchase a flexible pass. In one embodiment, a flexible pass has a lower booking priority than a performer pass. For instance, because the purchaser of a performer pass has committed to a particular performer and/or performance, he or she will receive priority over the holder of a flexible pass for shows or performances by the particular performer. Thus, in one embodiment, performer pass holders are granted first access, and flexible pass holders are granted second access.

In another embodiment, a flexible pass booking window may commence a predetermined period of time prior to the scheduled performance date. During this time, the holder of a flexible pass may reserve tickets to select shows and performances. For instance, the flexible pass booking window may commence 2 weeks before the booking date (the date on which the performer and venue agree on a performance date and time, i.e., the date on which the performer must decide whether the performance will take place or be canceled) and end 24 hours prior to the performance date. In this embodiment, the holder of the a flexible pass may reserve tickets to any performance corresponding to the particular flexible pass booking window. In one embodiment flexible passes offer admission to a performance, but only to the extent that performer pass holders have not purchased tickets to the performance. In another embodiment, the flexible pass booking window may be shorter than the performer pass booking window, which may run from the publishing of the performance date up to the commencement of the standby pass booking window, for example. In another embodiment, a holder of a flexible pass may not change or alter ticket reservations made during the booking window. In one embodiment, a flexible pass may be offered individually or as part of a package, such as a 2-pack, 3-pack, 4-pack, or 6-pack, for example. In one embodiment, the cost or price of a flexible pass may depend on demand in a given area. In another embodiment, the cost or price is the same regardless of where they are purchased or where the performance takes place. In another embodiment, any difference between the price paid for a flexible pass(es) and the cost of admission to a particular performance may be automatically deducted or added to the purchasing fan's account with system 100, for example. In another embodiment, money spent on purchasing flexible passes may be used to provide the purchasing fan with additional incentives and bonuses.

According to another embodiment, a flexible pass may expire if not used by the purchasing fan within a certain period of time. This feature permits performers better to anticipate the size of their fan base, and thus better estimate the venue size needed for upcoming performances. For instance, a flexible pass may expire after a specified period of time after its purchase date, such as 2 months, for example. In this example, the purchasing fan may use the flexible pass to make a reservation(s) for an upcoming performance during the booking window, for example. If the flexible pass comprises a package, such as a 6 pack, for example, then each of the passes comprising the package may expire after a certain period of time. Therefore, in the example of a 6-pack of flexible passes, each of the 6 passes may have a 2-month period during which it must be used. This way, the purchasing fan has, in effect, twelve sequential months of flexible pass privileges and benefits. In another embodiment, the individual passes making up a package expire sequentially in order to avoid bundling of passes at the end of the package period. In another embodiment, a flexible pass may expire after the last pass of a package is used, or the expiration of the last pass, which comes first.

A standby pass may, in one embodiment, be pre-sold and may permit the purchaser to attend any performance that has not been sold-out 24 hours prior to the performance date. In one embodiment, a fan may purchase a standby pass via system 100, and more specifically via Market Module or Interface 240. In this embodiment, a standby pass may be printed by the purchasing fan on a printer (not shown) associated with client station 105, for example, or may be picked up by the fan at the venue on the date of the performance, i.e., will call. In one embodiment, a standby pass permits its holder unlimited access to general shows on an as-available basis. In another embodiment, a fan must have at least one performer pass in order to purchase a standby pass. In another embodiment, a standby pass booking window may permit the purchaser of a standby pass to reserve tickets to a performance. In one embodiment, the standby pass booking window may commence 24 hours before the performance and end when the performance starts. In another embodiment, the standby pass booking window may commence at the expiration of the flexible pass booking window. In another embodiment, standby passes may be offered individually, as packages, or for a specified period of time, such as one year, for example. In one embodiment, fans may choose to automatically renew a standby pass on the day of expiration.

According to one embodiment of the invention, a purchasing fan may not receive a refund of tickets, passes, coupons, vouchers, or other performer endorsement entity, unless: the show or performance is canceled, and the performer does not reschedule within a reasonable period of time, such as 2 months, for example; and the purchasing fan does not wish to recycle the funds and apply them to a new, different ticket, pass, coupon, voucher, or other performer endorsement entity associated with another performer. In another embodiment, a purchase of a performer, flexible, or standby pass may purchase a guest pass to be used by a guest of the fan. In this embodiment, the guest may be entitled to the same benefits and privileges as the purchasing fan.

According the one embodiment, the invention may be used to provide incentives to fans who purchase performer, flexible, or standby passes, for example. In one embodiment, the invention may provide purchasing fans with numbers or identifiers that may be used in building and managing a program of fan incentives and bonuses. For instance, such numbers or identifiers may indicate the particular fan's commitment to a particular performer, for example. In another embodiment such numbers or identifiers may be provided on a per-performer basis or a system-wide basis. For example, a fan that is be a high consumer of passes for a particular jazz performer may be given priority over other fans in situations where there is a shortage of tickets, for example. In one embodiment, incentives and bonuses are determined and numbers are assigned to fans based on the status of a fan's performer passes (active versus inactive, for example), and the fan's participation and purchases to date, i.e. how many performer, flexible, and standby passes the performer has purchased. In one embodiment, two numbers may be rewarded: a fan number and a system number, for example.

A performer number may, for example, be awarded or assigned to fans who purchase performer passes in support of a specific performer. In one embodiment, the lower a fan's performer number, the more rewards the fan is eligible to receive. For example, the fan having performer number 0001 would be eligible to receive a high number of rewards, incentives, and bonuses. In one embodiment, performer numbers are generated and assigned chronologically based on when a fan purchases a performer pass to a specific performer. In this embodiment, the sooner a fan purchases a performer pass, the better the benefits, incentives, and rewards the fan may ultimately receive. In another embodiment, the performer number may be based, in part, on financial considerations, such as how many passes, merchandise, or other items the fan has previously purchased. In another embodiment, a fan must retain an active performer pass in order to maintain a performer number. That is, if a fan's performer pass expires, then any performer number corresponding to that particular performer will also expire. In another embodiment, a fan's performer number is not static and may change depending on changes in the fan's (or another fan's) commitment to a performer. For example, a fan's performer number may improve should a fan with a higher performer lose his or her performer number.

In another embodiment, the performer may be based on points received by the fan. That is, the more purchases made by the fan, the more points received. In another embodiment, the points received may be used to obtain incentives, rewards, or bonuses.

A system number may, for example, be awarded or assigned to those fans who achieve a certain level of financial participation, for example, regardless of any particular performer affiliation. In one embodiment, the lower a fan's system number, the more rewards the fan is eligible to receive. For example, the fan having system number 0001 would be eligible to receive a high number of rewards, incentives, and bonuses. In one embodiment, the system number assigned is a function of cumulative financial participation. In other words, the more a fan purchases, the more valuable his or her system number. In another embodiment, the system number may be determined based on a fan's collection of performer numbers, overall historical ticket purchases, and overall spending on merchandise or other products and items.

In another embodiment, the system number may be based on points received by the fan. That is, the more purchases made by the fan, the more points received. In another embodiment, the points received may be used to obtain incentives, rewards, or bonuses. In another embodiment, the present invention may be used to reward fans by providing cash-back bonuses to fans purchasing a high volume of passes and/or merchandise, for example.

In another embodiment, incentives may likewise be provided to venues and performers.

Figure 7:
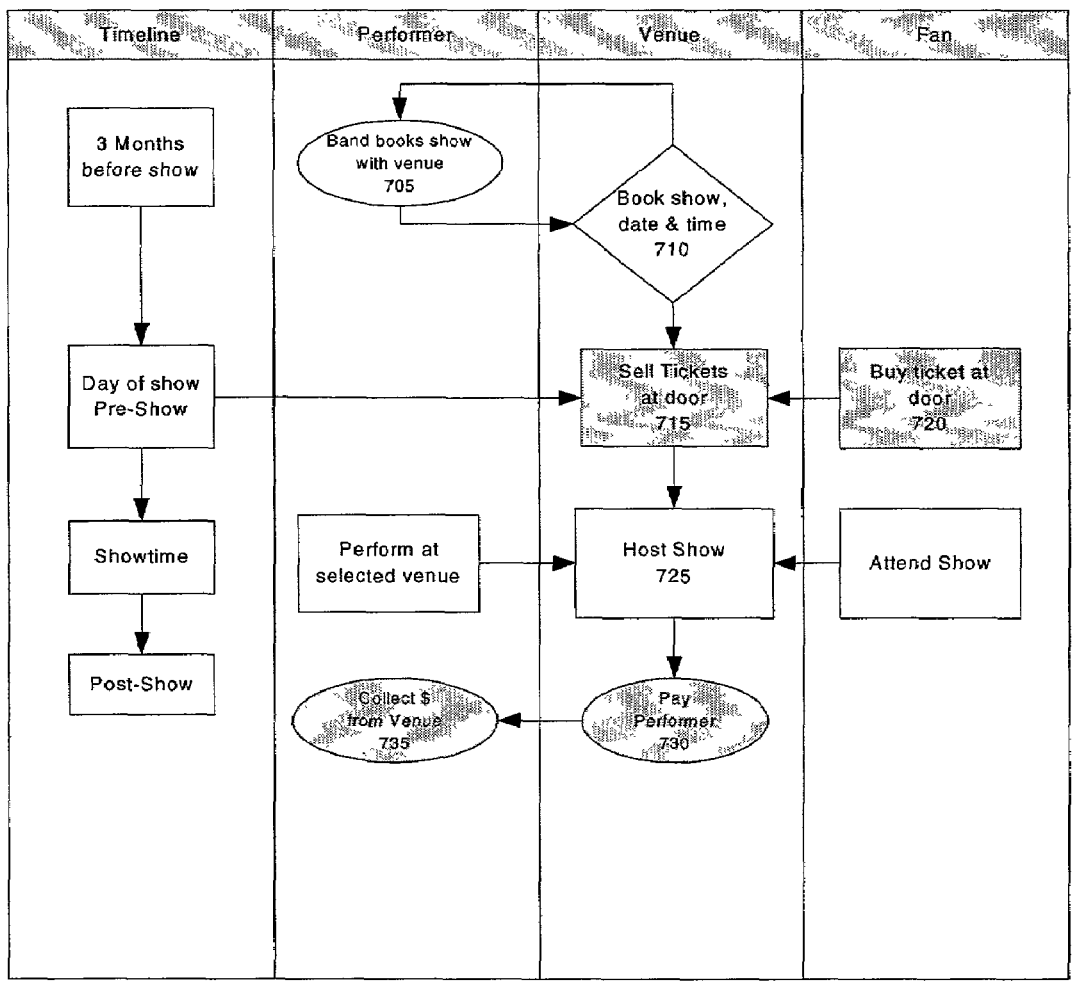
FIG. 7 is a flow diagram illustrating a prior art process for booking a performance venue.

FIG. 7 illustrates the prior art method 700 that performers and venues usually go through to book performance space. Typically, three months before the show takes place—as shown by 705 and 710—the performer and a venue agent must arrive at a mutual understanding as to the date and time of the performance, and the financial terms of the agreement. Next, on the day of the show—as shown by 715, 720, 725, and 730—the venue sells tickets at the door to interested fans. The revenue generated by the tickets sales will then be applied to cover the venue's expenses and agreed upon profits and, if anything is left, the bands will collect a cash payment at 730 and 735 from the venue.

Figure 8:
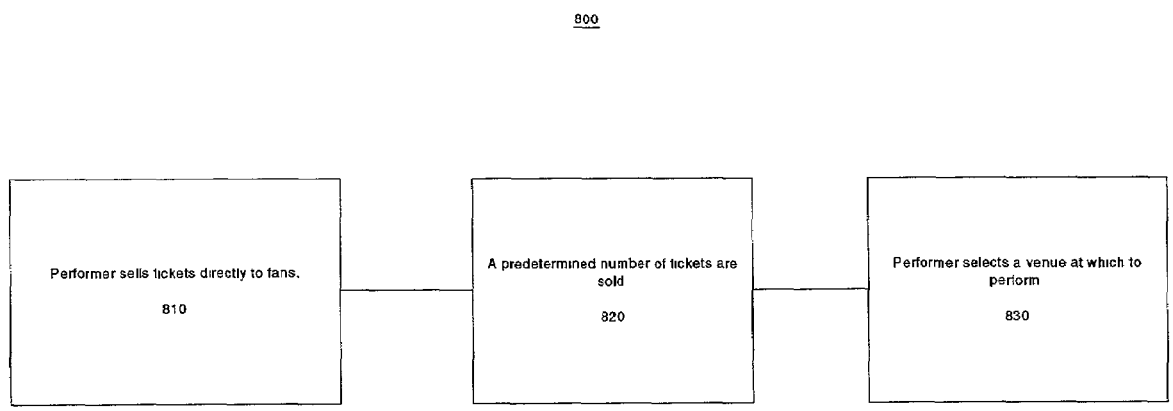
FIG. 8 is a flow diagram illustrating one embodiment of a process for booking a performance venue according to the present invention.

FIG. 8 illustrates one embodiment of a method 800 for booking a performance venue according to the present invention. Contrary to the prior art method shown in FIG. 7, the inventive method of FIG. 8 may be used by a performer to establish a marketable fan base prior to engaging a venue. In one embodiment, the performer may sell tickets directly to the fans or consumers (step 810) in an online marketplace, such as the system 100 disclosed and described in FIGS. 1-6. According to one embodiment, ticket sales may continue until the performer is able to sell a predetermined number of tickets, as shown in step 820. In one embodiment, the predetermined number of tickets is equal to a percentage of the venue size needed to stage the performance. Once this occurs, the performer has established a sufficient fan base to be able to market its performance(s) to potential venues, as shown at step 830. In one embodiment, the performer selects at least one venue in which to hold its performance from a variety of venues available through system 100. In another embodiment, the performer may determine the venue by holding an auction whereby the most attractive bid will be selected. For instance, assume five venues are interested in hosting a performance where the performer has managed to sell 80% of the tickets available. The venues may then present bids which would include a dollar amount, as well as other features and amenities offered to performers and fans. Presented with the numerous venue bids, the performer may then select the venue(s) that best suits its needs.

Figure 9:
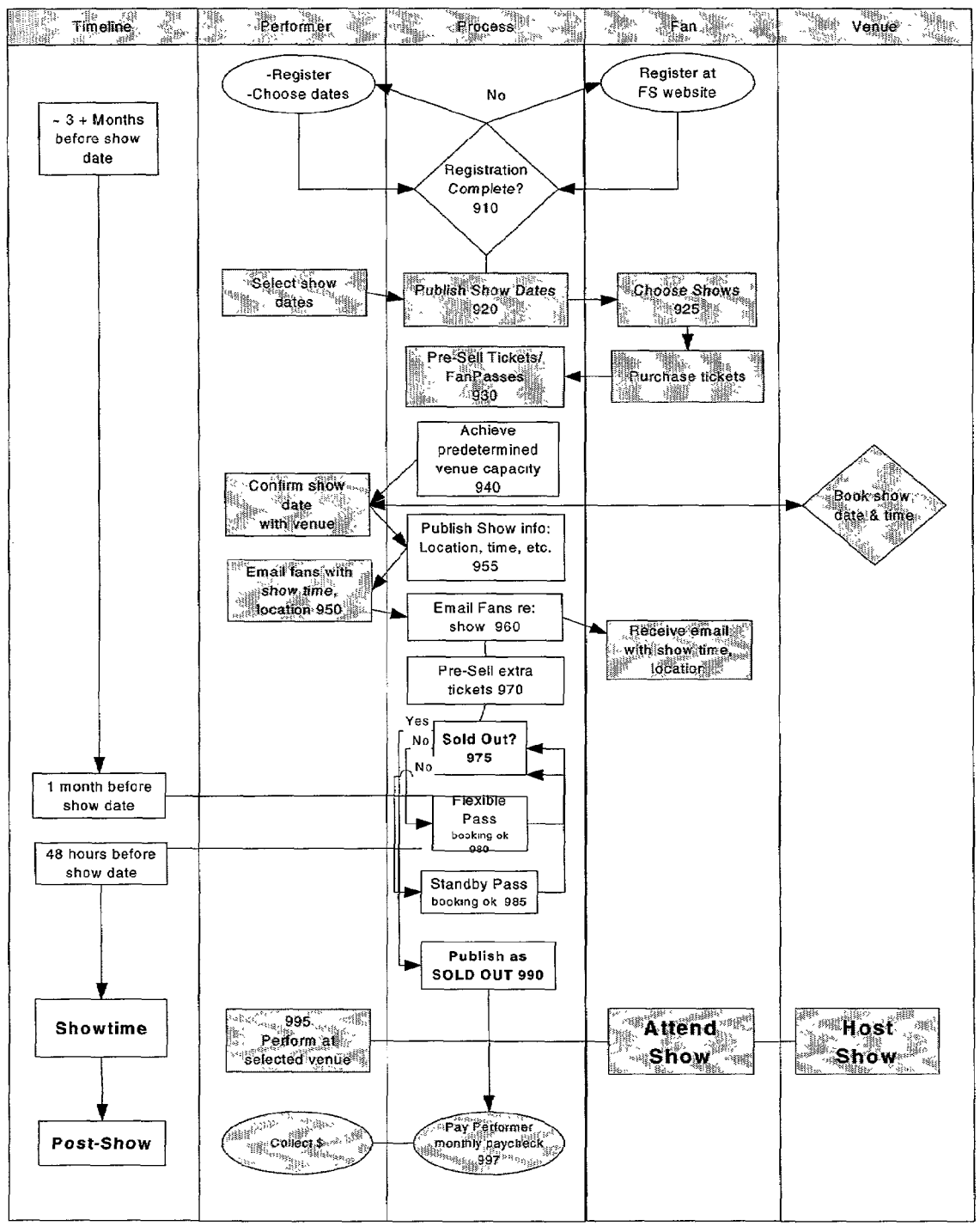
FIG. 9 is a flow diagram illustrating one embodiment of a process for booking a performance venue according to the present invention.

FIG. 9 illustrates another embodiment of a method 900 for booking a performance venue according to the present invention. According to one embodiment, the method 900 is performed by the system 100 disclosed in FIGS. 1-6 and described above. In one embodiment, approximately three months before a desired performance date, a performer may complete the registration process of system 100, as shown at step 910. At this time, the performer provides the required information and selects at least one date when he would like the performance to take place. The performer may further provide information such as the size of the desired venue and the location or region where the performance will take place. Simultaneously, various fans may be registering to access system 100.

Next, at step 920, the date(s) and location of the performance selected by the performer are published for fans and venues to browse. In one embodiment, the date(s) and region(s) are published via Market Module or Interface 240. Other information may also be published. Once the date(s) and location are published, the performer may begin selling tickets or passes to interested consumers. In one embodiment, this may be done via the Sales Module or Interface 610 disclosed in FIG. 6. Interested fans may then access the system 100 and purchase the desired tickets or passes, as shown at step 925. The selling process may continue up through the night of the performance, or a predetermined period of time prior. According to one embodiment, individual or group tickets to the performance are sold. In another embodiment, fan passes—such as performer, flexible and standby passes—may be used by fans to reserve tickets to the performance.

Next, at step 940, once the performer sells a predetermined number of tickets or passes—which may be equal to a percentage of the desired venue size, for example—he or she may be able to approach a vendor and leverage a favorable scheduling agreement. Specifically, the venue will be guaranteed—based on the pre-sold tickets or passes to fans—to attain a more predictable attendance count, and, more importantly, a higher amount of revenue. At step 950, the performer and the venue may confirm a performance date and time. In one embodiment, this date may be referred to as the booking date. In one embodiment, venue selection and confirmation may be done via the Venue Selection Module or Interface 620 disclosed in FIG. 6. At steps 955 and 960, therefore, the performer and the venue may publish the performance date and time on system 100 for fans to access, and/or the fans can be provided the information via electronic mail or standard mail delivery.

Next, at step 970, the performer and the venue may continue to pre-sell tickets or passes to the performance. In one embodiment, the may be done via Sales Module or Interface 610. At step 980, a determination is made whether any fans or customers have received flexible passes, rewards, coupons, free tickets, vouchers, or other incentives that would enable them to attend the performance. If yes, the corresponding fans are notified via system 100 or electronic mail, for example, and the available tickets are reduced accordingly. At step 985, a determination is made whether any fans or consumers have standby passes, tickets, rewards, coupons, vouchers, or other incentives that would enable them to attend the performance. If yes, the corresponding fans are notified via system 100 or electronic mail, for example, and the available tickets are reduced accordingly. In one embodiment, steps 970-985 are repeated until no further tickets are available at which time the performance is published as sold out, as shown at step 990.

Figure 10:
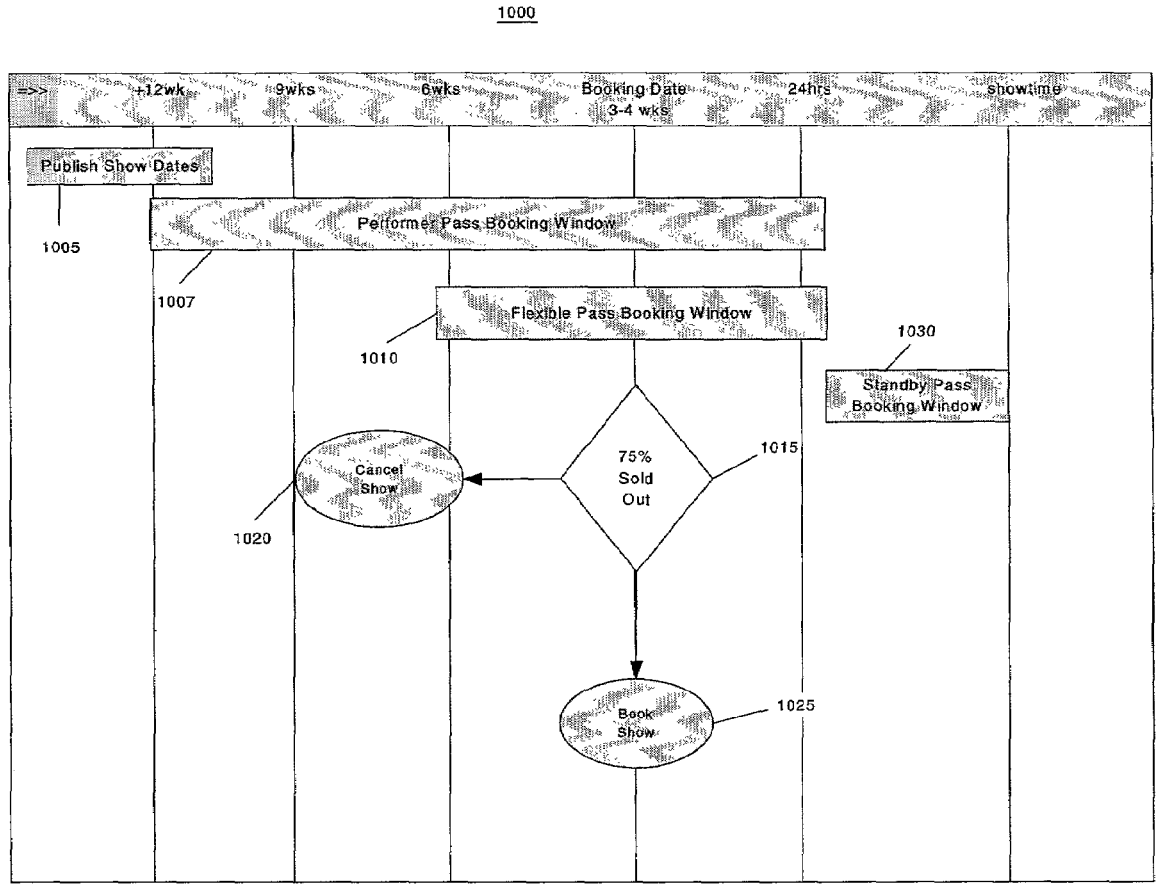
FIG. 10 is a flow diagram illustrating one embodiment of a process for selling performer, flexible, and standby passes according to the present invention.

FIG. 10 illustrates one embodiment of a process 100 for retailing passes according to the present invention. As shown, at step 1005—approximately 12 weeks before the performance—the performer may publish the performance date and the location or region where the performance will take place. Next, at step 1007, fans having purchased performer passes may be given the opportunity to reserve tickets to the performance during a Performer Pass Booking window. In one embodiment, the Performer Pass Booking window may continue until 24 hours before the performance. Next, at step 1010, fans having a flexible pass may be given the opportunity to reserve tickets to the performance during the Flexible Pass Booking Window. In one embodiment, the Flexible Pass Booking window may continue until 24 hours before the performance. At step 1015, which in one embodiment occurs on the booking date, the performer must decide whether the scheduled performance will take place. In one embodiment, the performer may decide to cancel the performance if a certain number of tickets have not been sold, as shown at step 1020. However, if the performer is satisfied with the number of tickets sold, the performance may be booked or confirmed, as shown at 1025. Finally, at step 1030, fans having a standby pass may be given the opportunity to reserve tickets to the performance during the Standby Pass Booking Window. In one embodiment, the Standby Pass Booking Window may start 24 hours before the performance and end the moment before the performance starts. According to one embodiment, steps 1005-1030 are performed via system 100.

While the foregoing description includes many details and specificities, it is to be understood that these have been included for purposes of explanation only, and are not to be interpreted as limitations of the present invention. Many modifications to the embodiments described above can be made without departing from the spirit and scope of the invention, as is intended to be encompassed by the following claims and their legal equivalents. For instance, although the invention is primarily described in relation to local performers desiring to develop and generate a fan base, it may nonetheless be used in any industry or context where generation of a like marketable entity is desired, such as theater, acting, film, politics, religious events, etc.

What is claimed is:

1. A method for booking a performance venue, the method comprising:

publishing at least one of a performance's expected performance date, region, and venue size over a communications link;

pre-selling at least one performer endorsement entity to the performance using a market module associated with a booking engine to at least one consumer using at least one client station, the at least one client station being connected to the booking engine over the communications link, wherein the at least one performer endorsement entities are pre-sold before a venue is booked, and wherein the total number of pre-sold performer endorsement entities at any given time comprises a marketable audience block, and wherein the marketable audience block is accessible to at least one venue and at least one performer or artist before a venue is booked; and selecting a particular venue, using the market module, at which the performance is to take place, the particular venue selected from a group of at least one venue.

2. The method of claim 1 wherein the tickets are sold by at least one of a performer and a third party.

3. The method of claim 1 wherein the performer selects the particular venue.

4. The method of claim 1 wherein the venue is selected after a predetermined number of performer endorsement entities are sold.

5. The method of claim 1 wherein the performance is canceled and rescheduled to a new date and time if a predetermined number of performer endorsement entities are not sold by a predetermined date prior to a performance date.

6. The method of claim 5 wherein the pre-sold tickets are valid for the new date and time of the performance.

7. The method of claim 1 wherein the pre-selling continues until the performance is sold out.

8. The method of claim 1 further comprising the step of paying the performer periodically based on the revenue generated from the pre-selling of at least one performer endorsement entity.

9. The method of claim 1 wherein the performer endorsement entity comprises at least one of a ticket, a bonus, a pass, a coupon, a voucher, a rebate, a periodic subscription, and an incentive.

10. The method of claim 1 further comprising the step of marketing the performance via the booking engine to the at least one consumer prior to pre-selling the at least one performer endorsement entity.

11. The method of claim 10 wherein the step of marketing further comprises presenting at least one of downloadable electronic files of at least one performer's music, information about the at least one performer, and information about the at least one venue.

12. The method of claim 11 wherein the at least one downloadable electronic files is in MP3 format or other format, such as Windows™ Media Audio™ and Real Audio™, etc.

13. The method of claim 1 wherein the market module further comprises a sales module that enables communication between the performer and the at least one consumer regarding the performance.

14. The method of claim 1 wherein the market module further comprises a venue selection module that enables communication between the performer and at least one venue regarding selection of the particular venue.

15. The method of claim 1 wherein the revenue generated from the pre selling of at least one performer endorsement entity is received by at least one of a performer and a third party.

16. The method of claim 1 further comprising the step of publishing at least one performance date over the communications link using the market module prior to pre-selling the at least one performer endorsement entity.

17. The method of claim 1 further comprising the step of publishing confirmed performance information over the communications link using the market module after the particular venue is selected.

18. The method of claim 1 further comprising the step of receiving a performer ticket sale proceeds after the performance date.

19. The method of claim 1 further comprising the step of distributing proceeds to a performer before, on, or after the performance date.

20. A system for booking a performance venue, comprising:
a booking engine enabling communication between at least two of a performer, a consumer, and a venue agent, the at least two of a performer, a consumer, and a venue agent using at least one client station connected to the booking engine over a communications link;
a market module associated with the booking engine for: (1) selling at least one performer endorsement entities before a venue is booked to at least one consumer, and wherein the total number of pre-sold performer endorsement entities at any given time comprises a marketable audience block, and wherein the marketable audience block is accessible to at least one venue and at least one performer or artist before a venue is booked, and (2) selecting a particular venue from a group of at least one venue.

21. The system of claim 20 wherein the tickets are sold by at least one of a performer and a third party.

22. The system of claim 20 wherein the booking engine further comprises a performance module for enabling the performer to access the booking engine.

23. The system of claim 22 wherein the performer accesses the performer module using a client station.

24. The system of claim 22 wherein the performer module further comprises a registration module enabling the performer to register to sell tickets and/or select venues.

25. The system of claim 24 wherein the registration module queries the performer for information.

26. The system of claim 25 wherein the information comprises at least one of a performer's name, address, telephone number, electronic mail address, music style, and any other information relevant to the booking process.

27. The system of claim 22 wherein the performer module further comprises an account module for inputting, processing, uploading, and presenting information related to performances and other performer-related information.

28. The method of claim 27 wherein the information comprises at least one the total number of performer endorsement entity sales, upcoming performance dates and times, historical performance information, electronic music files, listings of consumers and venues, and performer promotional information.

29. The system of claim 22 wherein the performer module further comprises a preference module for inputting, processing, and presenting performer preferences.

30. The system of claim 29 wherein performer preferences comprises at least one of a size of the venue, location of the venue, sound and acoustic requirements, minimum capacity requirements, maximum capacity requirements, non-smoking designated areas, desirable features and amenities, and comments relating to various venues and consumers.

31. The system of claim 20 wherein the booking engine further comprises a venue module for enabling the venue agent to access the booking engine.

32. The system of claim 31 wherein the venue agent accesses the venue module using a client station.

33. The system of claim 31 wherein the venue module further comprises a registration module enabling the venue agent to register to market itself to performers and consumers, access performance and consumer information, and input a vendor profile.

34. The system of claim 33 wherein the registration module queries the venue agent for information.

35. The system of claim 34 wherein the information comprises at least one of a venue agent's name, address, telephone number, electronic mail address, venue name, venue address, telephone number, venue website address, venue size, venue capacity, and any other information that may be relevant to the booking process.

36. The system of claim 31 wherein the venue module further comprises an account module for inputting, processing, and presenting information related to scheduling and availability.

37. The system of claim 36 wherein the venue information comprises at least one of the total upcoming performances booked at the venue, the identity of the performances booked, historical performance statistics, historical performer statistics, available future dates and times, and booked future dates and times.

38. The system of claim 31 wherein the venue module further comprises a facilities module for inputting, processing, and presenting information related to venue space limitations, seating capacity, retail capabilities, parking capacity, and sound and lighting capabilities.

39. The system of claim 20 wherein the booking engine further comprises a consumer module for enabling the consumer to access the booking engine.

40. The system of claim 39 wherein the consumer accesses the consumer module using the client station.

41. The system of claim 39 wherein the consumer module further comprises a registration module enabling the consumer to register to buy tickets and to obtain information about performers and venues.

42. The system of claim 41 wherein the registration module queries the consumer for information.

43. The system of claim 42 wherein the information comprises at least one of the consumer's name, address, phone, electronic mail address, and financial instrument information such as credit or debit card account and checking account.

44. The system of claim 43 wherein the consumer module further comprises an account module for inputting, processing, and presenting consumer information.

45. The system of claim 44 wherein the consumer information comprises at least one of upcoming performances for which the consumer has purchased tickets, past performances, attended by the consumer, upcoming performances the consumer is interested in attending, and performers or venues for which the consumer would like information.

46. The system of claim 20 wherein the market module further comprises a payment module for receiving, processing, and making payments based on the pre-selling of performer endorsement entities.

47. The system of claim 20 wherein the booking engine further comprises communications means for enabling communication between at least two of the performer, the consumer, and the venue.

48. The system of claim 21 wherein food, drink, and other concession products or merchandise are pre-sold via the market module along with the performer endorsement entities.

49. The system of claim 1 wherein the performer, the consumer, and the venue provide feedback or comments via an online form.

50. The system of claim 49 wherein the feedback or comment is used by the booking engine to rank or rate at least one of the performers, performances, venues, and consumers.

51. A system for facilitating the booking of a venue, comprising:
    means for inputting at least one expected date, region, and venue size for a performance;
    means for publishing the expected date and region of the performance;
    means for pre-selling tickets to the performance before a venue is booked, the tickets being pre-sold directly to at least one consumer by a performer of the performance, the total number of pre-sold tickets comprises a marketable audience block, wherein the marketable audience block is accessible to at least one venue and at least one performer or artist before a venue is booked; and
    means for selecting at least one venue after a predetermined number of tickets are sold.

52. The system of claim 51 further comprising means for providing incentive programs to at least one of a consumer, venue, and performer.

53. The system of claim 52 wherein the incentive programs comprise at least one of a performer number and a system number.

54. The system of claim 52 wherein the incentive programs comprise a cash-back program whereby consumers can receive money.

55. The system of claim 51 wherein the pre-sold tickets comprise at least one of a performer pass, a flexible pass, and a standby pass.

56. A method for booking a performance venue, the method comprising:
    publishing at least one of a performance's expected performance date and region over a communications link;
    pre-selling at least one performer endorsement entity to the performance using a market module associated with a booking engine to at least one consumer using at least one client station, the at least one client station being connected to the booking engine over the communications link, wherein that at least one performer endorsement entities are pre-sold before a venue is booked, and wherein the total number of pre-sold performer endorsement entities at any given time comprises a marketable audience block, and wherein the marketable audience block is accessible to at least one venue and at least one performer or artist before a venue is booked; and
    selecting a particular venue at which the performance is to take place.

57. The method of claim 56 wherein the venue is selected after a certain number of tickets are sold.

* * * * *